US008090632B1

(12) United States Patent
Ortiz et al.

(10) Patent No.: US 8,090,632 B1
(45) Date of Patent: Jan. 3, 2012

(54) PROVIDING A PACKAGE IDENTIFIER

(75) Inventors: Lester Ortiz, Camuy, PR (US); Geoff Lyon, Menlo Park, CA (US); Salil Pradhan, San Jose, CA (US); Vinay Deolalikar, Mountain View, CA (US); Alipio Caban, Arecibo, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1685 days.

(21) Appl. No.: 11/264,176

(22) Filed: Nov. 1, 2005

(51) Int. Cl.
*G06Q 10/00* (2006.01)

(52) U.S. Cl. .......... 705/28

(58) Field of Classification Search .......... 705/28; 235/1
See application file for complete search history.

(56) References Cited

U.S. PATENT DOCUMENTS 6,354,493 B1 * 3/2002 Mon .......... 235/380
6,496,806 B1 * 12/2002 Horwitz et al. .......... 705/28
6,988,079 B1 * 1/2006 Or-Bach et al. .......... 705/28
7,173,515 B2 * 2/2007 Ohki et al. .......... 340/5.61
7,277,866 B1 * 10/2007 Or-Bach et al. .......... 705/28
2003/0089771 A1 * 5/2003 Cybulski et al. .......... 235/385
2003/0158795 A1 * 8/2003 Markham et al. .......... 705/28
2004/0111335 A1 * 6/2004 Black et al. .......... 705/28
2005/0234835 A1 * 10/2005 Stonoha et al. .......... 705/401
2006/0086809 A1 * 4/2006 Shanks et al. .......... 235/492
2007/0063844 A1 * 3/2007 Jenney et al. .......... 340/572.1
2007/0119929 A1 * 5/2007 Swan et al. .......... 235/385
2007/0137531 A1 * 6/2007 Muirhead .......... 108/51.3

OTHER PUBLICATIONS

RFID Update: Global standards for supply chain. Packaging Magazine , p. 18 May 5, 2005.*

* cited by examiner

*Primary Examiner* — Matthew Gart
*Assistant Examiner* — Seye Iwarere

(57) ABSTRACT

A package identifier for a package having at least one sub-package is generated. A package identifier generating function is performed on at least one sub-package identifier of the at least one sub-package to generate the package identifier. In addition, the generated package identifier is stored for use in authentication.

22 Claims, 7 Drawing Sheets

PROVIDING A PACKAGE IDENTIFIER

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeited products may enter the supply chain to the customer at any number of different points in the supply chain. For example, a wholesaler may receive counterfeit goods which it passes on to a retailer, or directly to the customer.

Because of the possibility of spoofing, where a counterfeiter copies the packaging of the product, manufacturers often attempt to prevent entry of counterfeit products into the marketplace by protecting the packages. Some approaches that manufacturers have used to make it difficult for counterfeiters include the use of holograms or three dimensional printing on packages. For example, a hologram of a company's logo is placed on a package so a customer buying the product knows that the product is from the company and is not a counterfeit. These approaches provide some deterrence; however, counterfeiting has become very sophisticated so that it is has become more difficult for manufacturers to provide product packaging that cannot be replicated by counterfeiters of the product.

SUMMARY

A package identifier for a package having at least one sub-package is generated. A package identifier generating function is performed on at least one sub-package identifier of at least one sub-package to generate the package identifier. In addition, the generated package identifier is stored for use in authentication.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system for authenticating packages having at least one sub-package is described herein. In the system, a package identifier may be generated based on the at least one sub-package of the packages. In addition, the package identifier may be stored at least one of on the package and on a server for authentication. In one embodiment, the at least one sub-package may include a sub-package identifier, which may be read from the at least one sub-package at an origination point of a supply chain. In this embodiment, a package identifier generating function may be performed on the at least one sub-package identifier to generate the package identifier. The package identifier generating function may be repeated by users at destination points of the supply chain to, for instance, modify the package identifier as the contents in the package change. In addition, authentication may be performed by comparing the package identifier generated by the users and the stored package identifier.

As used throughout the present disclosure, a "package" may refer to an individual container, a carton, a pallet, or any type of receptacle for products on which identification information may be stored.

Figure 1:
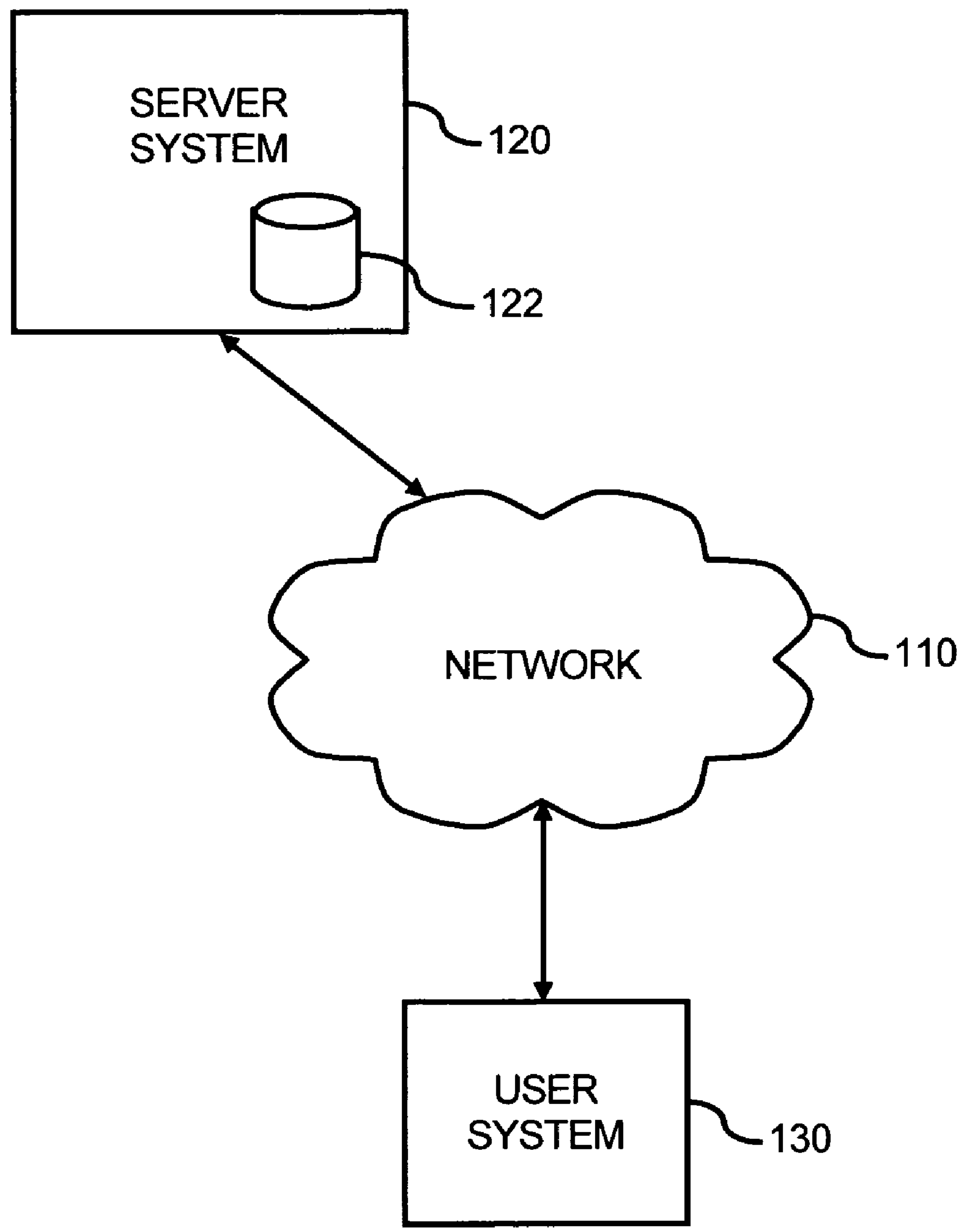
FIG. 1 illustrates an example of an authentication system, according to an embodiment of the invention.

FIG. 1 illustrates a simplified example of a system 100 through which packaging of a product may be authenticated. The system 100 may include a network 110, a server system 120 and a user system 130. The server system 120 and the user system 130 may include any type of computer system, such as the computer system described with reference to FIG. 8. The server system 120 may include a network interface including software and/or hardware, and serving software (not shown) for communicating with other systems connected to the server system 120 through the network 110. The server system 120 may also include a database 122 storing information with which the server system 120 may authenticate packages. The network 110 may include any type of network, including a LAN, a WAN, the Internet, etc.

In the system 100, a user system 130 may send package information regarding features of a package to be authenticated to a server system 120 via the network 110. The package information may be input into the user system 120 by using a reader, manually typing information, or any other known procedure for manually or automatically inputting data into a computer system. The reader may include any type of a reader for reading information, including any reasonably suitable type of scanner (such as a bar code scanner), a radio frequency identification ("RFID") tag reader, etc.

The user system 130 may submit the package information to the server system 120 through a website administered by the server system 120. The server system 120 compares the received information to information stored in a database 122. The server system 120 also transmits a message indicating that the package is authentic or informing the user system 130 that the package may not be authentic via the network 110. The message transmitted by the server system 120 may include a message sent to the user's browser or an email or other type of message, including facsimiles. In other embodiments, the user system may submit the package information through a non web based user interface to the server system 120.

Figure 2:
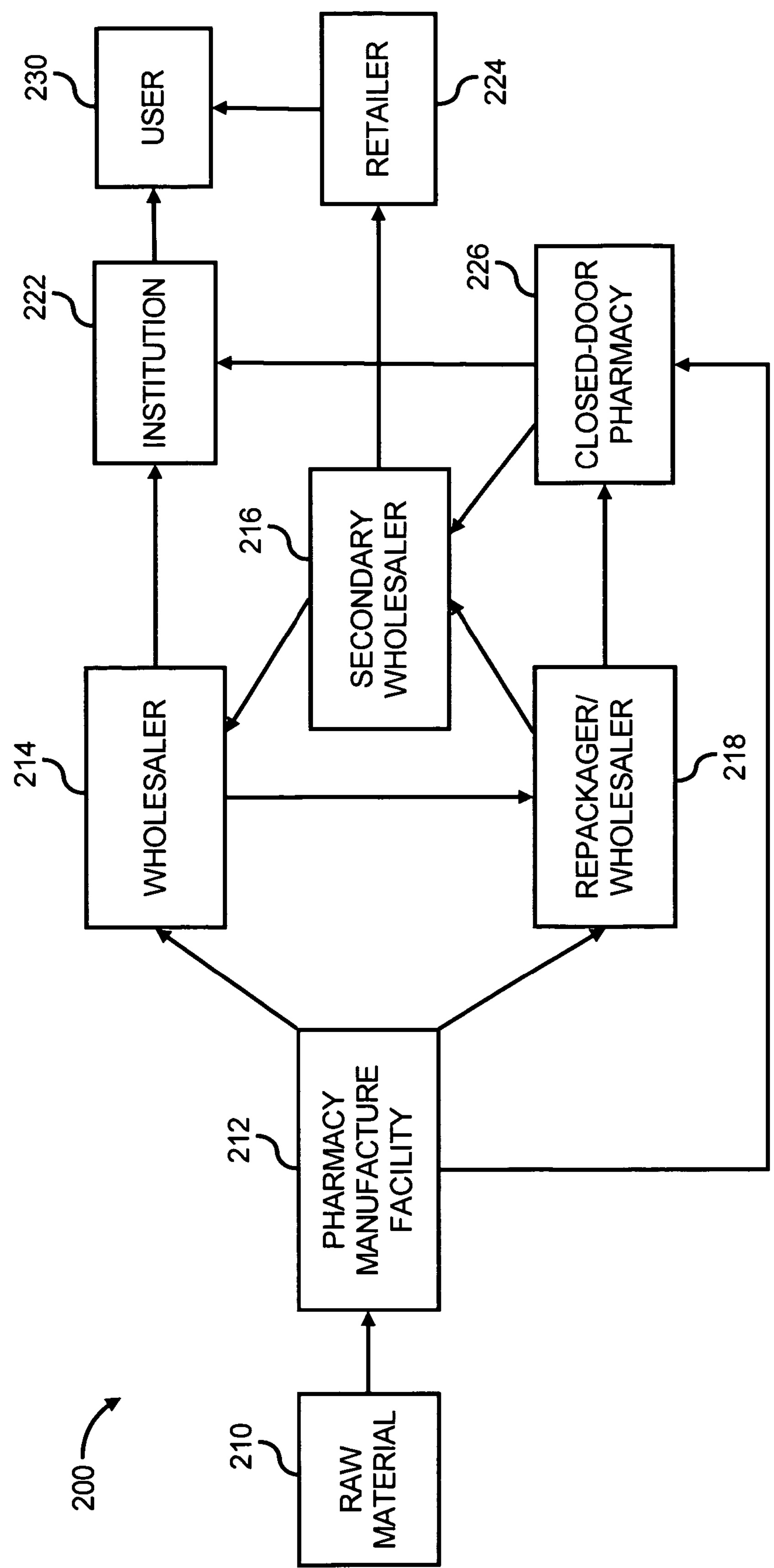
FIG. 2 illustrates an example of a supply chain in which the authentication system may be used, according to an embodiment of the invention.

The system 100 may be used to authenticate any type of product at any point of a supply chain, from the manufacturer to the customer. As an example, FIG. 2 illustrates a pharmaceutical supply chain 200 and use of the authentication system in FIG. 1 in the pharmaceutical supply chain 200. It should be readily apparent that the authentication system may be used in supply chains for many product types and should thus not be construed as being limited to the pharmaceutical supply chain 200 illustrated in FIG. 2.

FIG. 2 illustrates a simplified example of a supply chain 200 for the sale of pharmaceutical ("pharma") products. As shown in FIG. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or pharmacies 224, which sell the pharma products to individual users 230. The wholesaler 214 may also send some of its received pharma products to the repackager/wholesaler 218.

The repackager/wholesaler 218 may sell the pharma products to closed-door pharmacies 226. The closed door pharmacies 226 sell the pharma products to institutions 222, such as hospitals, nursing homes or hospices. The PMF 212 may also directly provide pharma products to the closed-door pharmacies 226.

Problems with counterfeit goods may arise with a network of secondary wholesalers 216. Some of the pharma products received by the repackager/wholesalers 218 or closed-door pharmacies 226 may end up at the secondary wholesalers 216, who may sell the pharma products at highly discounted prices to pharmacies 224. The secondary wholesalers 216 may also sell some of the pharma products to the wholesalers 214.

Due to the number of entities handling the pharma products as they progress through the supply chain, pharmacies 224 and institutions 222 may receive counterfeit pharma products. For example, secondary wholesalers 216 may receive counterfeit products, which the secondary wholesalers 216 may sell to pharmacies 224 or wholesalers 214, introducing the counterfeit products into the supply chain. Counterfeit pharma products may include, for instance, pharma products that have been reimported into the country from abroad, pharma products that have expired (but the expiry dates have been changed on the packaging), or pharma products not manufactured by the PMF 212 that are packaged in packaging designed to spoof the packaging of actual pharma products.

The authentication system 100 in FIG. 1 may be used in the supply chain 200 to authenticate pharma products produced by the PMF 212. The server system 120 used to authenticate the pharma products may be administered, for instance, by the PMF 212 or administered by an agent of the PMF 212. The user system 130 may be located at any of the other locations in the supply chain 200, including the institution 222, the pharmacies 224, closed-door pharmacies 226, the wholesaler(s) 214, repackager/wholesaler(s) 218, secondary wholesaler(s) 216, or individual user 230. Also, the user system 130 may be located at any point outside of the supply chain where authentication is desired.

Figure 3:
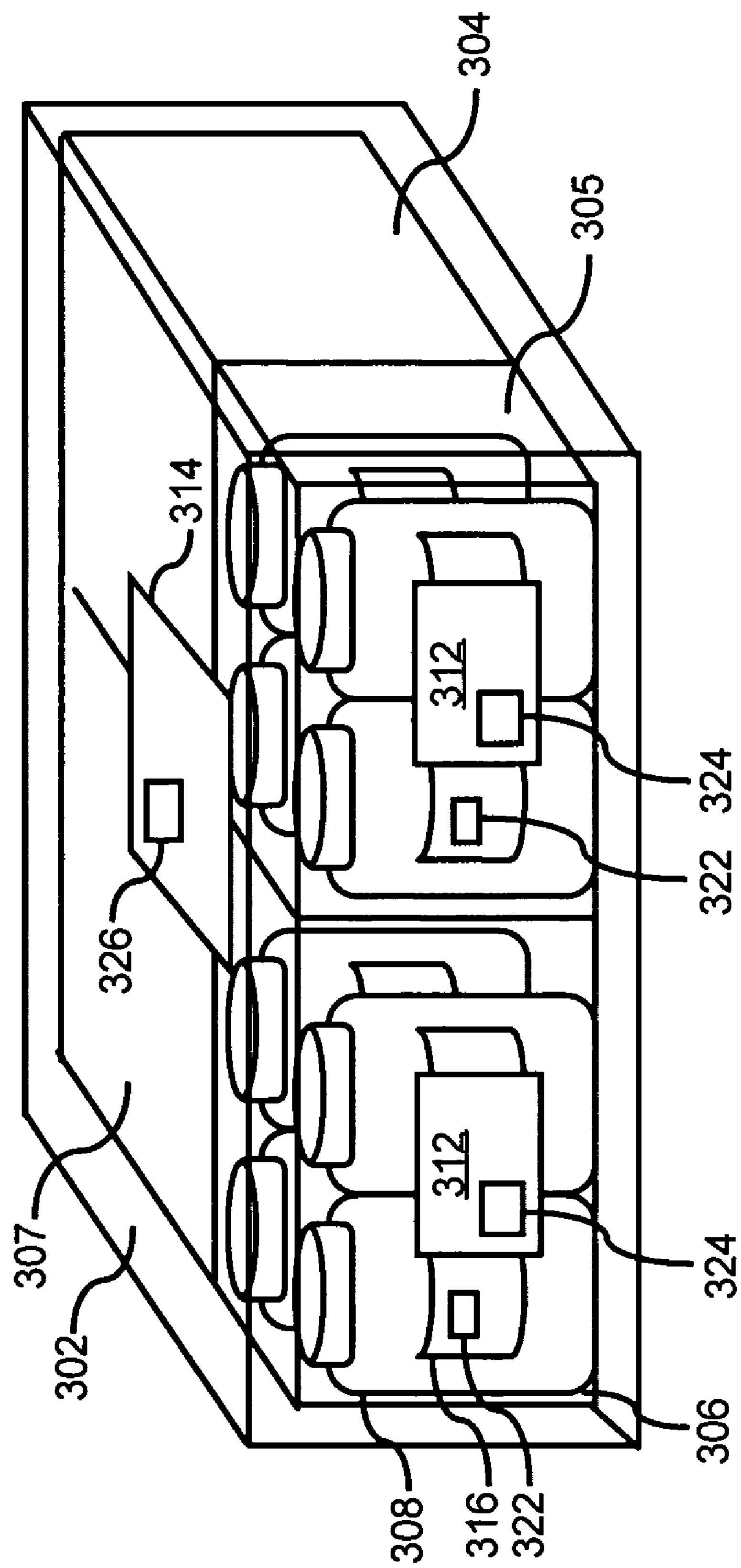
FIG. 3 illustrates an example of a package in that includes one or more package identifiers, according to an embodiment of the invention.

FIG. 3 illustrates an example of a package 302 that may include a package identifier. The package may include an outer package 302 that encloses inner packages or sub-packages 304-307. The outer package 302 may include, for instance, a pallet, box, or other type of container. The inner packages 304-307 may include boxes or items or other packages which may be enclosed in the package 302. The inner packages 304-307 may include further inner packages (items 308). The further inner packages (items 308) may include, for example, boxes or items, such as bottles, cans, etc., that may be enclosed in the inner packages 304-307. Each item 308 may hold products, such as drug capsules, food items, or other consumer goods. The items 308 may be referred to as sub-packages of at least one or both of the inner packages 304-307 and the outer package 302, while the inner packages 304-307 may be referred to as sub-packages of the outer package 302.

An outer package label 314 may be affixed to the outer package 302. In addition, an inner package label 312 may be affixed to each inner package 304-307 contained within the outer package 302. Each of the items 308 may also have a label 316 affixed to it. Thus, the example illustrated in FIG. 3 includes three levels of labels associated with three levels of packages. Each level of package may also include a package identifier store, which may be employed to store respective identifiers of each of the packages 302, 304-308.

For example, each item 308 may include an item package identifier store 322. Each inner package 304-307 may include an inner package identifier store 324. Each outer package 302 may include an outer package identifier store 326. Although each package identifier store 322, 324, 326 is shown on a label, the package identifier stores may be affixed at various other suitable locations on the packages 302, 304-308 without departing from a scope of the package 302 depicted in FIG. 3.

Figure 4:
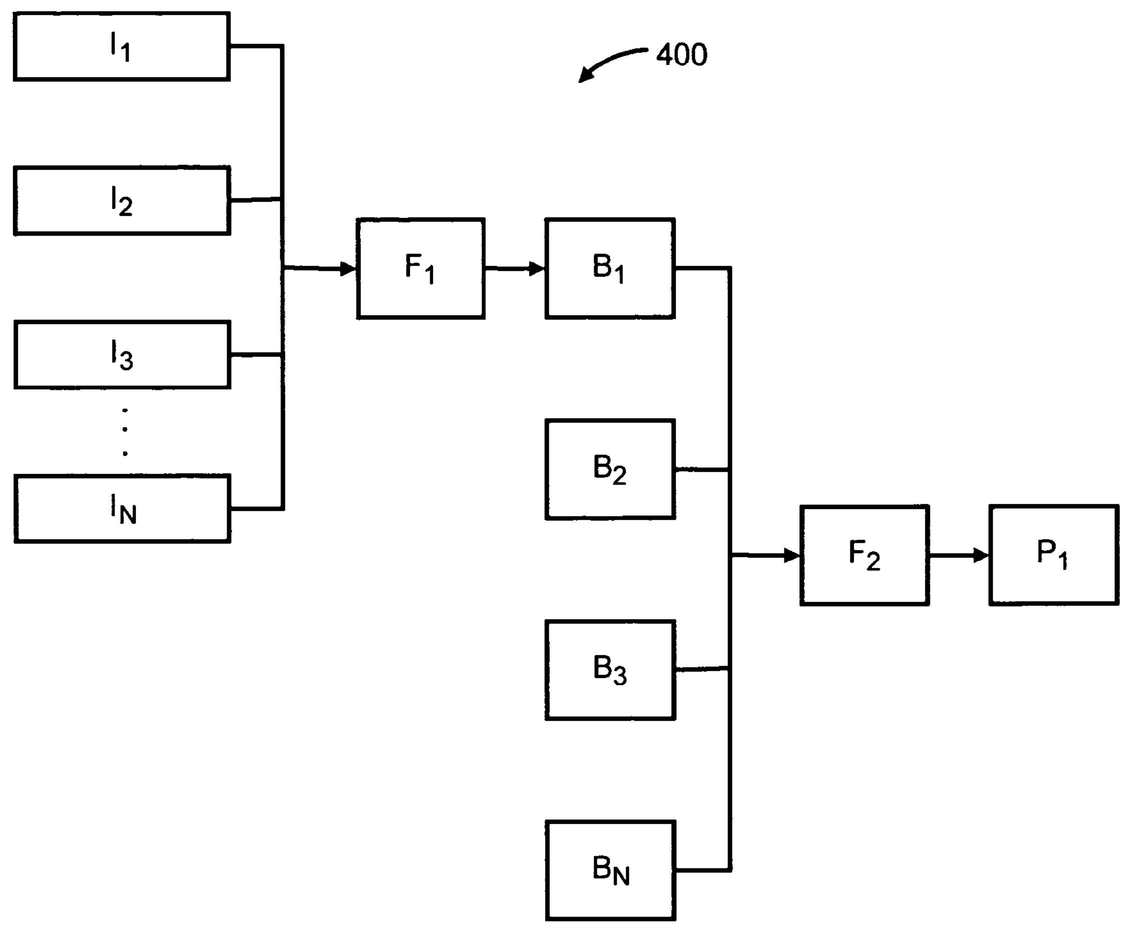
FIG. 4 illustrates a diagram of a process for generating package identifiers, according to an embodiment of the invention.

FIG. 4 illustrates a diagram 400 of a process for generating package identifiers, according to an example. In the example illustrated, a package identifier for a package $P_1$ including three levels of packages, may be generated by applying functions $F_1$, $F_2$, such as encryption functions, to each of the inner levels of packages. For example, the level of package corresponding to an item 308 described in FIG. 3 may include item package identifiers $I_1$-$I_N$. Each item package identifier $I_1$-$I_N$ may include a pseudo-random number or other code printed on, encoded within, or otherwise incorporated within the item 308, such as by storage of the package identifier $I_1$-$I_N$ in the item package identifier store 322.

As shown in FIG. 4, one or more of the item package identifiers $I_1$-$I_N$ may be input into a first function $F_1$. The application of the first function $F_1$ to the one or more item package identifiers $I_1$-$I_N$ may generate an inner package identifier, such as a box identifier $B_1$. Each box identifier $B_1$-$B_N$ may be generated using the first function $F_1$ from the one or more item identifiers $I_1$-$I_N$ contained in respective inner packages 304-307. Each box identifier $B_1$-$B_N$ may be printed on, encoded within, or otherwise incorporated within each inner package 304-307, such as by storage of the box identifier $B_1$-$B_N$ in each corresponding inner package identifier store 324.

One or more of the box identifiers $B_1$-$B_N$ may be input into a second function $F_2$. The application of the second function $F_2$ to the one or more box identifiers $B_1$-$B_N$ may generate an outer package identifier, such as a package identifier $P_1$. The package identifier $P_1$ may be generated using the function $F_2$ on one or more the box identifiers $B_1$-$B_N$ within the outer package 302. The package identifier $P_1$ may be printed on, encoded within, or otherwise incorporated within the outer package 302, such as by storage of the package identifier $P_1$ in the outer package identifier store 326.

One or both of the first function $F_1$ and the second function $F_2$ may include at least one of a one-way function and an XOR function. A one-way function is a mathematical function or computational algorithm that allows for computation of a next value, such as $B_1$, in a sequence of values by using one or more current values, such as $I_1$-$I_N$, in the sequence of values as an argument, or parameter, to the function or computational algorithm. However, it is mathematically and/or computationally intractable to determine from the next value, such as $B_1$, the current value(s), such as $I_1$-$I_N$, from which the next value was generated using the one-way function. A well known one-way function includes data encryption standard ("DES").

Many hash functions are also examples of one-way functions. Hash functions generally allow a large number of numeric or textual values to be mapped onto a smaller number of hash chains. The hash function produces a unique hash-chain for any given number or text string, but many different numbers or text strings may be hashed to the same hash chain or hash bucket. Therefore, while the hash function reliably maps numeric or textural values to their corresponding hash chains, it is generally not possible, based on the identity of the hash chain, to deduce the numeric or textual value mapped to the hash chain by the hash function. As such, a package identifier generated through application of a hash function on one or more sub-package identifiers is relatively difficult or impossible to decipher without having the required information.

In some embodiments, the first function $F_1$ and the second function $F_2$ may include the same function. In addition, one or both of the first function $F_1$ and the second function $F_2$ may be applied at any point of the supply chain 200 at which products are packaged or repackaged.

If the first function $F_1$ and the second function $F_2$ are applied at a point in the supply chain where the products are repackaged, each function may be applied using one or more of the inner level identifiers or using the stored package identifiers and one or more of the inner level identifiers that have been removed. For example, if an item 308 corresponding to item identifier $I_3$ has been removed, the box identifier $B_1$ may be generated using one or more of $I_1$, $I_2$ and $I_4$-$I_N$. Alternatively, the box identifier $B_1$ may be generated using $B_1$ and $I_3$. By way of example, if the first function F1 is an XOR function, an XOR function may be performed first on $B_1$ and $I_3$. If the result of the XOR function on $B_1$ and $I_3$, for example $B'_1$, is the same as $B_1$, the box identifier $B_1$ need not be changed. If, however, the XOR function indicates that $B_1$ and $B'_1$ are not the same, the modified box identifier $B'_1$ may be stored in the identifier store to replace the stored box identifier $B_1$. Thus the modified box identifier $B'_1$ would replace the box identifier $B_1$. The package identifier $P_1$ may also be generated and replaced in similar manners.

Figure 5A:
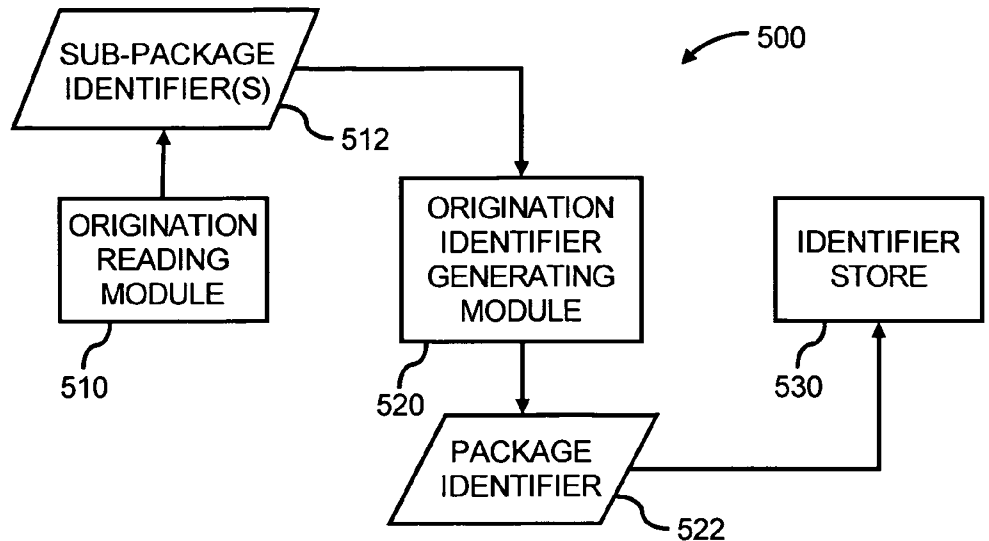
FIG. 5A illustrates a simplified example of data flow in a system to provide a package identifier, according to an embodiment of the invention.

FIG. 5A illustrates a simplified example of data flow in a system 500 for providing a package identifier. The package identifier providing system 500 may, for instance, be employed to generate one or both of the box identifier $B_1$ and the package identifier $P_1$ depicted in FIG. 4. As such, particular reference is made to the elements shown in FIG. 4 in the following description of FIG. 5A. It should, however, be understood that the package identifier providing system 500 may be employed to generate package identifiers other than those depicted in FIG. 4.

The package identifier providing system 500 may include an origination reading module 510 and an origination identifier generating module 520. The origination reading module 510 and the origination identifier generating module 520 may be located at the PMF 212 or any other point of the supply chain shown in shown in FIG. 2. In some embodiments, the origination reading module 510 and the origination identifier generating module 520 may be part of the server system 120 shown in FIG. 1.

The origination reading module 510 may include a scanning device or other reading device. At the origination reading module 510, information affixed to packages may be read. For instance, sub-package identifiers 512 may be read from identifier stores of sub-packages of a package. For example, one or more of the item identifiers $I_1$-$I_N$, as shown in FIG. 4, may be read from sub-packages, such as the items 308 shown in FIG. 3. At the origination identifier generating module 520, a package identifier 522 may be generated for the package. For example, a box identifier $B_1$ may be generated using a function, such as the first function $F_1$(FIG. 4). In addition, for instance, the package identifier $P_1$ may be generated using a function, such as the second function $F_2$ (FIG. 4) at the origination identifier generating module 520.

In one example, the package identifier 522 may be stored in an identifier store 530 for use in authentication. The package identifier 522 may be stored in an identifier store 530, which may include an indicator, such as, a label, printed material, etc., configured to be affixed on the package 302. In addition, or alternatively, the identifier store 530 may include a database at a server system, such as the database 122 shown in FIG. 1. If the identifier store 530 includes the server database 122, the package identifier 522 may be stored in the server database with reference to other information identifying the package. For example, the package identifier 522 may be stored with reference to a serial number identifying the package. Authentication may be performed by comparing package identifiers derived by an entity to the package identifier(s) 522 stored in the identifier store(s) 530, as described below with reference to FIG. 5B.

If the identifier store 530 includes an indicator, the package identifier 522 may be affixed using any reasonably suitable affixing method. For example, the package identifier 522 may be affixed using a printing proces, a label, a RFID tag or an embedded microprocessor, an electronic substrate or some active electronic device with memory capabilities and internal power used to store the encrypted information until it is further accessed for authentication at some other point of the supply chain.

By way of example, the package identifier 522 may be stored in the inner package identifier store 324 (FIG. 3). In some embodiments, the inner package identifier store 324 may include an RFID tag. The RFID tag may include one or more types of information for the inner package 304-307, such as a serial number and the package identifier 522.

If the package identifier 522 comprises an RFID tag, the RFID tag may use radio frequency technology to transmit information stored in the RFID tag. For example, the RFID tag may include an integrated circuit and an antenna. The RFID tag preferably includes a passive RFID tag (not using an internal power source such as a battery). However, an active RFID tag (using an internal power source, such as a battery) may be used. The RFID tag may be read by a RFID reader (not shown). In operation, the RFID reader may generate a magnetic field for interrogating the tag using an antenna, which may include an inductive element. The magnetic field induces an energizing signal for powering the RFID tag via the antenna. When powered, the RFID tag generates a signal that may include information associated with the inner package 304-307. The signal is modulated using a known modulation scheme and transmitted to the RFID reader.

The RFID tag employed as the package identifier 522 may be read or written to from distances of up to 20 feet, and is not required to be in the line of sight of the RFID reader to be read. For example, the object causing the loss of the line of sight may allow radio waves to pass through the object, such as plastic or paper objects. The RFID tag may be affixed onto the package prior to, during, or after a process of printing information on the material used to form the package or on material affixed to the package, such as the label 312. It will be apparent to one of ordinary skill in the art that instead of a RFID tag, other techniques may be used for storing the package identifier 522 on the inner package 304-307, such as bar code, variable color text, color lines, fingerprint patterns, color tiles, microtext, and other printed patterns with encoded information and other types of printed mediums. Also, tags other than radio frequency, and other storage mediums that may be affixed to or may be included in the inner package 304-307 may be used.

Figure 5B:
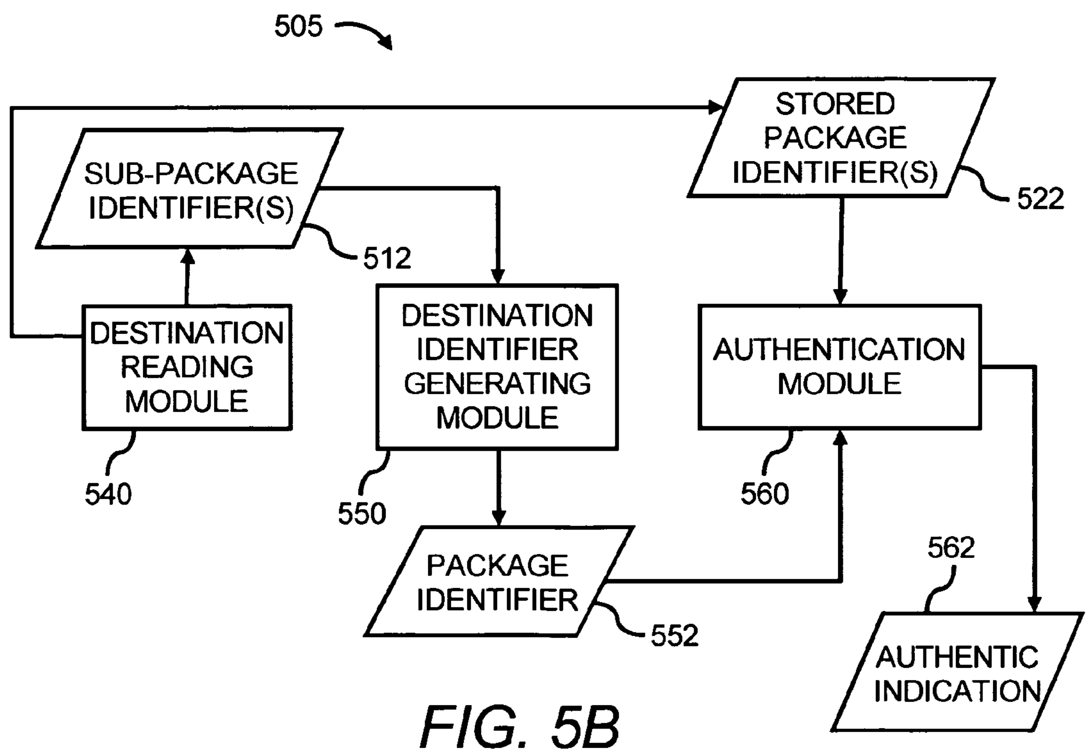
FIG. 5B illustrates a simplified example of data flow in an authentication system, according to an embodiment of the invention.

FIG. 5B illustrates a simplified example of data flow in a system 505 for authenticating products. The authentication system 505 includes a destination reading module 540, a destination identifier generating module 550 and an authentication module 560. The destination reading module 540, the destination identifier generating module 550 and the authentication module 560 may be located at any point of the supply chain shown in shown in FIG. 2 where authentication is desired, including, for example, at a retailer 124, by a user 130 or by a wholesaler 114. In some embodiments, the destination reading module 510, the destination identifier generating module 550 and the authentication module 560 may be part of the user system 130 shown in FIG. 1.

The destination reading module 540 operates in a manner similar to the origination reading module 510 (FIG. 5A). In this regard, the destination reading module 540 may include a scanning device or other suitable reading device. At the destination reading module 540, information affixed to packages may be read. For instance, sub-package identifiers 512 may be read from identifier stores of sub-packages of a package. For example, item identifiers $I_1$-$I_N$, as shown in FIG. 4, may be read from sub-packages, such as items 308 shown in FIG. 3. The destination reading module 540 may also read stored package identifiers 522 affixed to the package or from a server database based on reference information, such as a serial number, matching the package to information stored in a server database, such as the database 122 shown in FIG. 1.

At the destination identifier generating module 550, a derived package identifier 552 may be generated for the package. For example, a box identifier $B_1$, as shown in FIG. 4, may be generated using a function, such as the first function $F_1$. In some embodiments, if the derived package identifier 552 is for a sub-package, the derived package identifier may be used as a sub-package identifier to generate a derived package identifier 552 for the package in which the sub-package is contained. Each derived package identifier 552 may be input into the destination identifier generating module 550 until the derived package identifier 552 for the outermost package, such as outer package 302 shown in FIG. 3, is generated. Authentication may be performed using the derived package identifier for the outermost package. For example, authentication may be performed using the derived package identifier corresponding to package identifier $P_1$ (FIG. 4).

At the authentication module 560, the derived package identifier 552 may be compared to the stored package identifier 522. The authentication module 560 may generate an authentication indication 562. For example, if the derived package identifier 552 matches the stored package identifier 522, the authentication indication 562 will include an indication that the package is authentic.

In some embodiments, the authentication module 560 may present the derived package identifier 552 to the server system 120 through the user system 130 for authentication. Thus, the comparison of the derived package identifier to the stored package identifier 522 may be performed by the server system 120. The user system 130 may submit the derived package identifier 552 to the server through a website administered by the server system 120. In other embodiments, the user system 130 may submit the derived package identifier 552 through a nonweb-based user interface accessing the server system 120.

Figure 6:
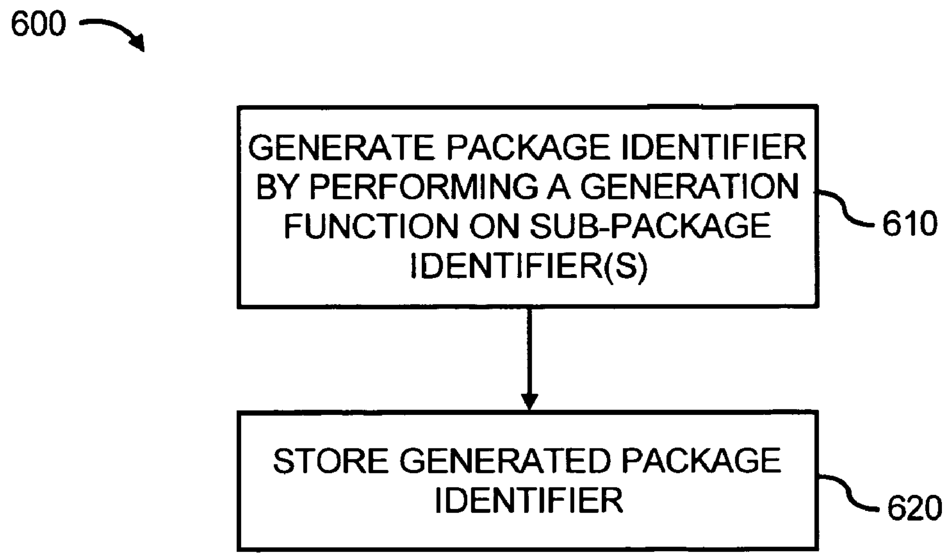
FIG. 6 illustrates a flow diagram of a method of providing a package identifier, according to an embodiment of the invention.

FIG. 6 is a flow diagram illustrating an embodiment of a method 600 of providing a package identifier, as shown in FIGS. 4 and 5A, which may be authenticated. At step 610, a package identifier may be generated by performing a package identifier generating function on at least one sub-package identifier of the package. For example, the package generating function may include one of the first function $F_1$ or the second function $F_2$ described with reference to FIG. 4. The package generating function may include a one-way function, such as a hash function or an XOR function. Generation of the package identifier may also include a reading of the one or more sub-package identifiers of at least one sub-package of the package.

At step 620, the generated package identifier, such as package identifier 522, may be stored for use in authentication. Storage of the generated package identifier 522 may include at least one of affixing of the generated package identifier to the package and storing of the generated package identifier in a server database, such as the server database 122 shown in FIG. 1.

The method 600 of providing a package identifier may further include performing a package identifier modifying function after one or more sub-packages of the package are removed. The package identifier modifying function may include performing the package identifier modifying function using the one or more sub-package identifiers of the removed one or more sub-packages and the stored package identifier. In some embodiments, the package identifier modifying function may be the same as the package identifier generating function.

The modified package identifier may be stored such that the modified package identifier replaces the stored package identifier in the event that the modified package identifier is not the same as the stored package identifier. In another embodiment, the stored package identifier may be replaced with the modified package identifier, without determining whether the modified package identifier matches the stored package identifier, so that the modified package identifier automatically replaces the stored package identifier.

Figure 7:
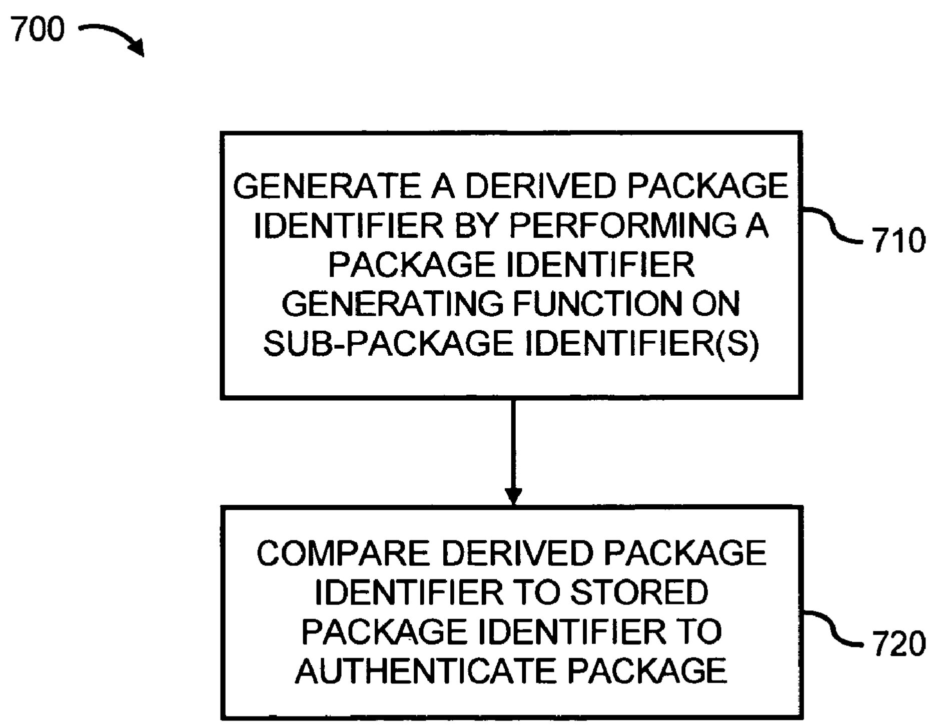
FIG. 7 illustrates a flow diagram of a method of authenticating a package, according to an embodiment of the invention.

FIG. 7 is a flow diagram illustrating a method 700 of authenticating a package, such as the package 302 shown in FIG. 3. At step 710, a derived package identifier, such as the derived package identifier 552 shown in FIG. 5B, may be generated by performing a package identifier generating function on at least one sub-package identifier of the package 302. Generating the derived package identifier 552 may include generating one or more derived sub-package identifiers to use in the package identifier generating function until the derived package identifier 552 for the outermost package is generated.

At step 720, the package 302 may be authenticated using the derived package identifier 552. In one embodiment, the derived package identifier 552 for the outermost package may be used to authenticate the package. In other embodiments, the derived package identifiers 552 for each level of a package may be used to authenticate the package 302.

Authentication of the package 302 may include a comparison of the derived package identifier 552 for the package to the stored package identifier 522 for the package. The authentication may be performed in one or both of the user system 130 and the server system 120, shown in FIG. 1. For example, the user system 130 may read the stored package identifier 522 from the package 302 or the user system 130 may receive the stored package identifier 522 from the server system 120.

In another example, the server system 120, as shown in FIG. 1, may receive the derived package identifier 522 from an entity in the supply chain shown in FIG. 2. The entity may transmit the derived package identifier 522 from the user system 130 to the server system 120. The server system 120 may administer an authentication website through which the entity may submit the description to the server system 120. In other embodiments, the user system 130 may submit the derived package identifier through a non-web based user interface accessing the server system 120.

The authentication method may also include transmission by the server system 120 of authentication information to the user system 130 based on a comparison of the derived package identifier 552 and the stored package identifier 522. For example, if the received derived package identifier 552 matches a stored package identifier 522, the server system 120 may transmit a message to the user system 130 indicating that the received derived package identifier 552 is an authentic package. If the derived package identifier 552 does not match a stored package identifier 522, the server system 120 may transmit a message to the user system 130 indicating that the derived package identifier 552 is not an authentic package. The message may include a facsimile, an email or a message displayed on a web page viewable in a web browser of the user system 130, where the web page is part of a website administered by the server system 120. In other embodiments, the message may be displayed on a non-web based user interface.

Figure 8:
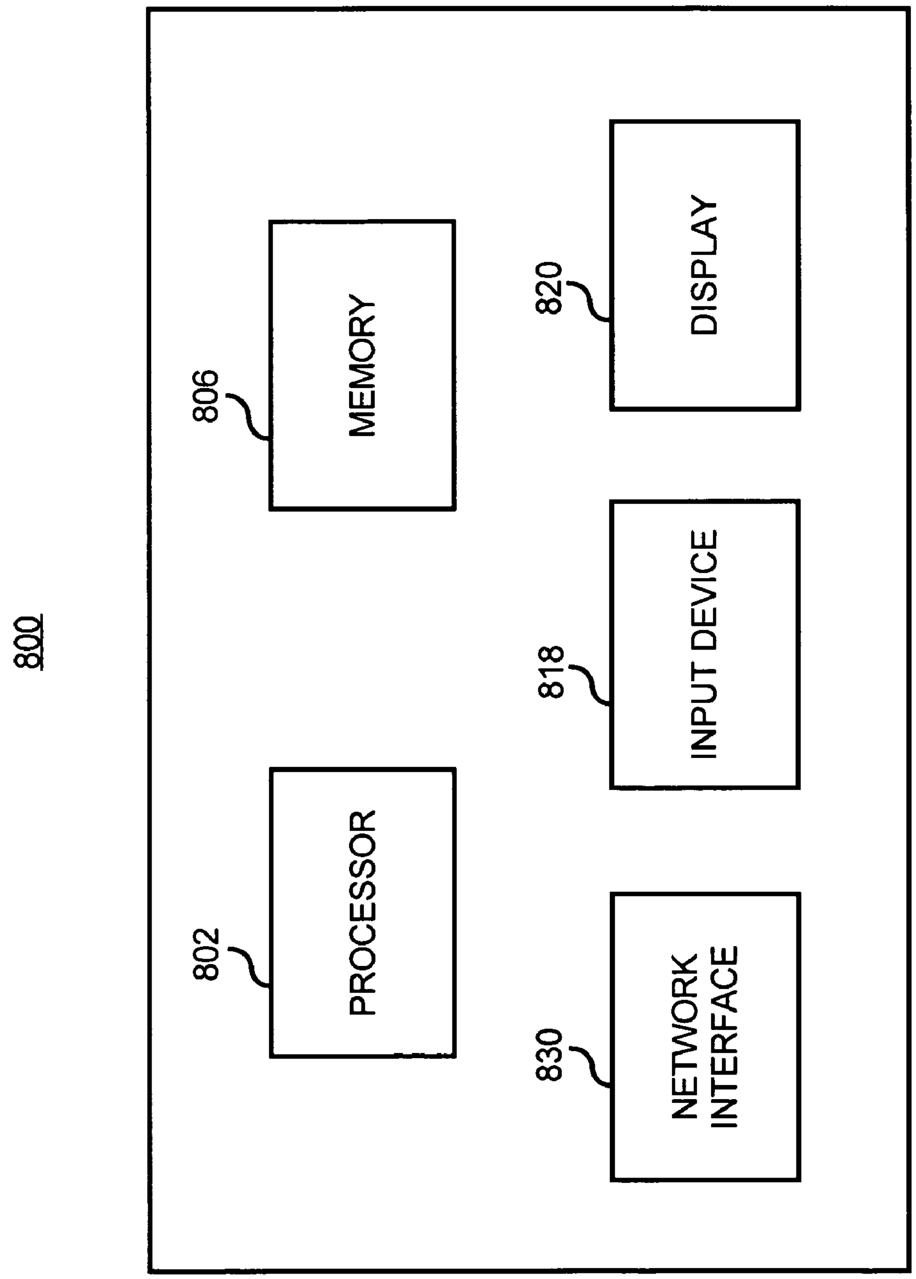
FIG. 8 is a block diagram illustrating a computer system operable to perform the method depicted in FIGS. 6 and 7, according to an embodiment of the invention.

Referring to FIG. 8, and also with reference to FIG. 1, a schematic diagram of a computer system 800 is shown in accordance with an embodiment. The computer system 800 shown may be used as a server in the system shown in FIG. 1. The computer system 800 may include one or more processors, such as processor 802, providing an execution platform for executing software. The computer system 800 also includes a memory 806, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 800 with one or more input devices 818, such as a keyboard, a mouse, a stylus, and the like and a display 820. A network interface 830 is provided for communicating with other computer systems. It will be apparent to one of ordinary skill in the art that FIG. 8 is meant to illustrate a generic computer system. Any type of computer system may be used. Furthermore, one or more components of the components of the computer system 800 are optional, such as the display and input devices, and other types of components may be used or substituted as is known in the art.

One or more of the steps of the operations shown in FIGS. 6 and 7 may be implemented as software embedded on a computer readable medium, such as the memory 806, and executed by the processor 802. The steps may be embodied by a computer program, which may exist in a variety of forms both active and inactive. For example, there may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of providing a package identifier for a package having at least one sub-package, the method comprising:

generating a package identifier by performing a package identifier generating function on at least one sub-package identifier of the at least one sub-package, wherein the package identifier is derived from the at least one sub-package identifier using the package identifier generating function; and storing the generated package identifier for use in authentication.

2. The method of claim 1, wherein the step of performing a package identifier generating function further comprises performing a one-way function on the at least one sub-package identifier.

3. Tile method of claim 1, wherein the package comprises a plurality of sub-packages, each of said sub-packages comprising respective sub-package identifiers, and wherein the step of performing a package identifier generating function further comprises performing an exclusive or (XOR) function on the sub-package identifiers.

4. The method of claim 1, wherein the step of performing a package identifier generating function further comprises performing a hash function on the at least one sub-package identifier.

5. The method of claim 1, wherein the step of storing the generated package identifier further comprises affixing the generated package identifier to the package.

6. The method of claim 5, wherein the step of affixing the generated package identifier to the package further comprises at least one of printing the generated package identifier on the package, placing a label on the package including the generated package identifier, storing the generated package identifier in a radio frequency identification ("RFID") tag and storing the generated package identifier in at least one of an embedded microprocessor, an electronic substrate and an active electronic device with memory capabilities and internal power.

7. The method of claim 1, wherein the step of storing the generated package identifier further comprises storing the generated package identifier on a server.

8. The method of claim 1, further comprising performing a package identifier modifying function to generate a modified package identifier after one or more of the sub-packages have been removed from the package.

9. The method of claim 8, wherein the package comprises a plurality of sub-packages, each of said sub-packages comprising respective sub-package identifiers, and wherein the package identifier modifying function comprises performing an exclusive or (XOR) function using sub-package identifiers of a plurality of removed sub-packages and the stored package identifier, the method further comprising:

storing the modified package identifier, wherein the modified package identifier replaces the stored package identifier.

10. The method of claim 8, further comprising replacing the stored package identifier with the modified package identifier, wherein the modified package identifier replaces the stored package identifier.

11. The method of claim 8, wherein the step of performing a package identifier modifying function comprises performing a package identifier generating function.

12. The method of claim 1, further comprising:

generating a derived package identifier; and comparing the derived package identifier to the stored package identifier to authenticate the package.

13. The method of claim 12, wherein the step of generating the derived package identifier further comprises performing a package identifier generating function on the at least one sub-package identifier of the at least one sub-package.

14. The method of claim 13, further comprising:

returning an indication that the package is authentic in response to the derived package identifier matching the stored package identifier.

15. The method of claim 14, further comprising:

reading the at least one sub-package identifier from the at least one sub-package from at least one of a printed material, a label, an RFID tag, an embedded microprocessor, an electronic substrate and an active electronic device with memory capabilities and internal power.

16. A system for identifying a package having at least one sub-package, said at least one sub-package having at least one sub-package identifier, the system comprising:

an identifier generating module configured to perform a package identifier generating function on the at least one sub-package identifier of the at least one sub-package to generate a package identifier, wherein the package identifier is derived from the at least one sub-package identifier using the package identifier generating function.

17. The system of claim 16, further comprising:

an authentication module configured to authenticate the package based on a comparison of the generated package identifier and a stored package identifier.

18. The system of claim 16, wherein the package comprises a palette and the at least one sub-package comprises at least one containers for holding at least one item, and wherein the identifier generating module is further configured to generate the package identifier to truck the at least one item contained in the at least one container.

19. A system for providing a package identifier for a package having at least one sub-package, the system comprising:

means for generating a package identifier by performing a package identifier generating function on at least one sub-package identifier of the at least one sub-package, wherein the package identifier is derived from the at least one sub-package identifier using the package identifier generating function; and means for affixing the generated package identifier on the package.

20. The system of claim 19, further comprising:

means for generating a derived package identifier by performing a package identifier generating function on the at least one sub-package identifier of the at least one sub-package; and means for comparing the derived package identifier to a stored package identifier to authenticate the package.

21. A computer program product embodied on a computer-readable medium and comprising code that, when executed, causes a computer to perform the following:

generate a package identifier by performing a package identifier generating function on a sub-package identifier of at least one sub-package, wherein the package identifier is derived from the at least one sub-package identifier using the package identifier generating function; and store the generated package identifier for use in authentication.

22. The computer program product of claim 21, that, when executed, further causes a computer to perform the following:

generate a derived package identifier by performing a package identifier generating function on the sub-package identifier of the at least one sub-package; and compare the derived package identifier to a stored package identifier to authenticate the package.

* * * * *

UNITED STATES PATENT AND TRADEMARK OFFICE
CERTIFICATE OF CORRECTION

PATENT NO. : 8,090,632 B1
APPLICATION NO. : 11/264176
DATED : January 3, 2012
INVENTOR(S) : Lester Ortiz et al.

It is certified that error appears in the above-identified patent and that said Letters Patent is hereby corrected as shown below:

In column 10, line 58, in Claim 3, delete "Tile" and insert -- The --, therefor.

In column 12, line 18, in Claim 18, delete "truck" and insert -- track --, therefor.

Signed and Sealed this
Twenty-third Day of October, 2012

David J. Kappos
*Director of the United States Patent and Trademark Office*